Patented Apr. 15, 1947

2,419,017

UNITED STATES PATENT OFFICE 2,419,017

METAL PROTECTIVE PIGMENT

Godfrey Grimm, Nutley, N. J., assignor to E. I. du Pont de Nemours & Company, Wilmington, Del., a corporation of Delaware No Drawing. Application March 20, 1943, Serial No. 479,911

3 Claims. (Cl. 106—292)

This invention relates to novel, pigment-useful substances, and more particularly to new pigment compositions comprising crystalline ammonium iron phosphate.

More specifically, the invention pertains to pigment compositions comprising ammonium ferrous phosphate found to be highly useful as a metal protective pigment and adapted to impart rust and corrosion-inhibiting characteristics to paints and coating compositions containing such pigment.

Metal protective pigments have been extensively used in the priming coat of organic film-forming compositions applied to the surface of metal objects. Some of these priming compositions function solely because of the protective action of the film over the metal. Experience has demonstrated, however, that such prior compositions are relatively ineffective in affording the adequate or complete protection sought.

Substantially all coating compositions employed as primers in the metal protective field contain as pigment ingredients one or more of a small group of pigments of which the most commonly used are iron oxide, red lead and certain chromium-containing pigments such as zinc yellow. Of these pigments, some have proved more effective than others and it is believed that the relative degree of effectiveness is, to a large extent, related to the degree of specific inhibiting or passivating action at the surface of the metal.

The degree of protection against corrosion which the priming coat affords will vary widely and is dependent upon a number of factors, including, for example, the type of metal covered, the conditions of the metal surface, the type of vehicle in the film-forming composition, the pigment used and the corrosive or other influences to which the ultimate film is subjected during exposure.

Up to the present time no fully acceptable priming pigment has been made available to the metal protective art. Pigments commonly employed heretofore exhibit certain undesirable characteristics which serve to deter their use for the intended purpose. Among such deterrents, not all of which are necessarily present with each prior art composition, may be mentioned ineffective inhibitive power, paint instability (such as hard caking and livering), chalking, blistering, etc. For example, although iron oxides have been very widely used in metal protective priming compositions, extensive tests have in general failed to demonstrate any specific inhibition of corrosion by reason of their employment. They have probably been used so widely because of their low cost and the relatively durable films which are characteristic of such paints. However, once the film is broken, either mechanically or through erosion, corrosion of the metal tends to proceed quite rapidly. Red lead is also well known as a metal protective pigment and enjoys wide use in the art but it exhibits a relatively high cost as used and serious reactivity with synthetic resin vehicles so that the manufacture of ready-mixed paints from such desirable vehicles is almost impossible. It also suffers from rapid settling and hard caking in the can with any vehicle, from rapid chalking and poor durability unless thoroughly covered with a top coat. Zinc yellow has, to some extent, replaced red lead and iron oxide, the latter because of its much greater specific inhibition of corrosion and the former, among other reasons, because of the ease with which ready-mixed paints made from synthetic resin vehicles can be manufactured from it. It has been used very widely on non-ferrous metals and is coming into more extensive use on ferrous metals. It would appear that the relative merits of red lead and zinc yellow in metal protective primers are not related as much to the theoretical values inherent in each pigment as to the conditions under which they are used, such as the condition of the surface to be painted, the vehicle used, the conditions of exposure (temperature, humidity, atmospheric gases and underwater immersion) and the like. Consequently, in view of the inherent disadvantages of the better-known prior pigments, the art has long been seeking pigments free from, or which overcome, these various disadvantages.

It is among the objects of this invention, therefore, to overcome the foregoing and other disadvantages characterizing prior types of pigments, and especially those proposed for use as metal protective pigments. A particular object of the invention is to provide novel and improved types of pigment compositions, especially pigment compositions which are highly effective in lending rust-inhibitive properties to organic film-forming compositions when incorporated therein and applied to metal surfaces or like objects subject to corrosion. A further particular object of the invention is the preparation of new pigment compositions which, when mixed with other pigments heretofore considered as relatively poor in rust-inhibitive properties, will impart desired rust-inhibitive characteristics to the resulting mixture. A further object of the invention is to provide a pigment composition exhibiting high metal protective efficiency and which at the same time is not objectionable with respect to opacity, covering power, tinctorial strength, light-fastness and other essential and necessary pigmentary qualities. Other objects and advantages of the invention will be apparent from the ensuing description of my invention.

These and other objects are attainable in this invention which comprises employing as an essential pigmenting substance in a coating composition used for metal protective purposes crystalline ammonium iron phosphate preferably having the major portion of its iron content in the ferrous state.

In a more specific and preferred embodiment, my invention comprises employing crystalline, flake-like ammonium ferrous phosphate conforming approximately to the formula

and preferably containing not less than 7% of $NH_3$ and not more than 10% of ferric iron, as an essential rust-inhibiting pigment composition in an organic film-forming vehicle or coating composition adapted for use in protecting metal or other surfaces against corrosive influences.

Prior to undertaking a more detailed description of my invention and in order that a more complete understanding thereof will be had, I shall first describe useful methods of testing pigment compositions for their metal protective properties. One manner of test comprises actual use of the pigment composition in metal protective primers in the field on full scale installations. Such metal structures as bridges, tanks and the like, are painted with the primers to be tested under conditions which in every respect conform to the usual conditions of maintenance, except that selected areas are painted with compositions containing the various test pigments. These structures are then observed from time to time and the relative protective value of the composition is noted and recorded. Such results are generally considered more significant than laboratory tests, but the time necessary to obtain results of any significance is excessively long and may run into a matter of several years.

An accelerated form of test method very commonly used for this purpose is to coat a series of relatively small panels of the particular metal in question with the particular test paints and to expose these panels under conditions of extreme tendencies to corrosion. Usually selected are a number of different atmospheric conditions, such as a rural atmosphere of the Northern states, an industrial atmosphere, and a sub-tropic atmosphere with brilliant sunshine, relatively high heat and relatively high humidity, such as Florida. It is also usual to expose the panel at a 45° angle to the vertical, facing South. Under extreme conditions, such tests will show some failure in a matter of months and reasonably conclusive results may be expected after about two years of exposure.

I have found that a still more accelerated test can be advantageously availed of in evaluating the products of this invention and that this method can be readily correlated with a more established method. In this accelerated test, the coating compositions to be tested are spread in a relatively thin film on very small panels of the desired metal (panel size approximately 1" x 3") and these panels are exposed with or without top coats under controlled conditions of alternating high humidity with moisture condensation and relatively dry atmospheres with sunshine. In such a test, failures have been obtained within as short a time as two or three months and relatively conclusive results are obtained in four to six months.

In evaluating test samples by any of the methods described above, a conventional grading system is used in which 10 represents complete freedom from corrosion and 0 represents substantially complete corrosion. The intervening figures are given as an approximate representation of the per cent of area corroded. Recently a tentative standard method has been proposed for such evaluations known as "A. S. T. M. Photographic Reference Standards D-610-41-T for evaluating degree of resistance to rusting obtained with paint on iron or steel surfaces." The same numerals are used for denominating the degree of corrosion and while the photographic standards are not based exactly upon the area corroded, for all practical purposes the two methods of grading may be considered as giving substantially the same reading. Because of its very wide use in the prior art, a priming coat of red lead ground at 30% pigment volume basis in raw linseed oil has come to be an accepted standard of reference in such tests as have been described above.

Having described the manner by which pigments prepared in accordance with my invention may be tested, I shall now undertake a more complete description of my invention and will refer to one practical and preferred embodiment thereof. It will be obvious that the invention is not to be construed as limited thereto.

In said preferred embodiment, ammonium iron phosphate is prepared, for example, by reacting a solution of an iron sulfate, such as copperas ($FeSO_4.7H_2O$), with secondary ammonium phosphate (($NH_4)_2.HPO_4$) in the presence of an alkali, such as caustic soda, and while maintaining the reaction mixture at a pH ranging from about 6.0 to 9.0 and at an elevated temperature (above 130° F.) with accompanying agitation of said mixture. Heating of the mixture is continued until substantially all of the original precipitate is converted to a flake-like, crystalline material, comprising ammonium ferrous phosphate, essentially insoluble in water and conforming approximately to the formula $NH_4FePO_4.H_2O$, except that a portion of its iron content may be in the ferric condition. The resulting precipitate is then filtered, washed free of soluble ions or other undesired impurities, and is then dried and pulverized. A slightly greenish, flake-like, crystalline powder is thereby obtained, being adapted for direct use as a pigment in organic film-forming vehicles particularly adapted for use in protecting metal surfaces. If desired, the pigment may be used as the sole pigmenting substance in such coating composition, or may be mixed with other types of pigments, whether of organic or inorganic origin, should a composite form of pigment be desired in such vehicles. Preferably, however, the pigment is used in the vehicle in admixture with other types of metal protective pigments, particularly zinc yellow or zinc oxide. Also, well-known diluents or extenders may be used in conjunction with the pigment or indicated mixtures, if use thereof is desired.

To a clearer understanding of the invention, the following examples are given, these being merely in illustration and not in limitation of my invention:

EXAMPLE I 199 parts of ferrous chloride ($FeCl_2.4H_2O$) was dissolved in 3000 parts of water at 88° C. To this was added in turn with agitation a solution of 46 parts hydrochloric acid (100% HCl) in about 100 parts of water, a solution of 5 parts of sodium sulfite in 50 parts of water and finally a solution of 360 parts of disodium phosphate ($Na_2HPO_4.12H_2O$) in 2500 parts of water. After thorough mixing of these solutions, a solution of 180 parts of ammonium hydroxide (100% $NH_4OH$) in about 350 parts of water was added rapidly under the surface and the mixture stirred for 15 minutes at 88° C. The apparently amorphous precipitate first formed on the addition of the $NH_4OH$ changed during the stirring period to a flake-like crystalline material. The precipitate was filtered, washed with 4000 parts of hot water and dried for about 16 hours at 140° F. 185 parts of a slightly greenish, flake-like crystalline powder was obtained which, in physical form and appearance, resembles ground mica or other diluents commonly known in the paint industry as flake extenders, hence my use of the term "flake-like." Microscopic examination has disclosed that the material crystallizes in irregular plates with a maximum thickness of about 0.3 micron and varying in the larger dimensions up to about 37 microns with the major portion in the approximate range of 3 to 4 microns.

The ammonium ferrous phosphate thus prepared was comparatively tested as an essential pigment ingredient of metal protective finishes in the following manner:

Paint A

A commercial zinc yellow pigment was ground at 40% pigment volume in raw linseed oil and drier and mineral spirits added to give a paint with the following composition:

| | Parts by weight |
|---|---|
| Zinc yellow | 60.5 |
| Raw linseed oil | 24.0 |
| Mineral spirits | 14.5 |
| Drier | 1.0 |
| | 100.0 |

Paint B

Ammonium ferrous phosphate was ground in like manner in raw linseed oil and the other ingredients added to give:

| | Parts by weight |
|---|---|
| Ammonium ferrous phosphate | 50.5 |
| Raw linseed oil | 28.8 |
| Mineral spirits | 19.7 |
| Drier | 1.0 |
| | 100.0 |

Paint A and Paint B were then mixed in suitable proportions to give the desired ratios of zinc yellow and ammonium ferrous phosphate and the resulting primer paints were painted in thin films onto steel panels about 1 inch x 3 inches. Two types of panels were used, sanded steel and prerusted steel. After drying for 48 hours the panels were exposed to the weather for approximately 8 hours during the middle of each day and to positive moisture condensation in a closed box for the remainder of each 24 hour period. A red lead paint ground at 30% pigment volume in raw linseed oil was used as the control.

The following table summarizes the results of this series:

| Zinc Yellow | AFP | Red Lead | Panel ratings—clean steel ||||| 
|---|---|---|---|---|---|---|---|
| | | | 2 days | 10 days | 20 days | 30 days | 62 days |
| 100 | ---- | ---- | 10— | 9+ | 7+ | 5 | 2 |
| 90 | 10 | ---- | 10— | 10— | 9+ | 9+ | 7+ |
| 79 | 21 | ---- | 10— | 10— | 10— | 10— | 8+ |
| 68 | 32 | ---- | 10— | 10— | 10— | 10— | 10— |
| --- | ---- | 100 | 10— | 10— | 10— | 10— | 9— |

| Zinc Yellow | AFP | Red Lead | Panel ratings—prerusted steel |||||
|---|---|---|---|---|---|---|---|
| | | | 2 days | 10 days | 20 days | 30 days | 62 days |
| 100 | ---- | ---- | 8— | 6+ | 6 | 5+ | ---- |
| 90 | 10 | ---- | 10— | 10— | 10— | 9+ | ---- |
| 79 | 21 | ---- | 10— | 10— | 10— | 7+ | ---- |
| 68 | 32 | ---- | 10— | 10— | 10— | 9— | ---- |
| --- | ---- | 100 | 10— | 10— | 10— | 10— | ---- |

EXAMPLE II 278 parts of copperas ($FeSO_4.7H_2O$) was dissolved in 2000 parts of water containing 60 parts of sulfuric acid (100%) and 66 parts of sodium chloride at 20° C. A solution of 5 parts of sodium sulfite in 40 parts of water was then added followed over a period of 3 minutes by a solution of 148 parts of secondary ammonium phosphate (($NH_4$)$_2.HPO_4$) in 600 parts of water at 20° C. The mixture was stirred 5 minutes. 129 parts of caustic soda in 400 parts of water at 20° C. was added quickly (not over 1 min.) to give a pH of 9.2–9.5. The mixture was heated to the boil in 20 minutes and boiled 20 minutes giving off strong fumes of ammonia ($NH_3$). About 50 parts of 10% $H_2SO_4$ was then added to give a pH of 8.0–8.5, after which the precipitate was filtered, washed free of sulfate ion, dried at 60° C., and pulverised. About 185 parts of a crystalline powder was obtained.

The following table compares a typical analysis of products made by this method with the theoretical analysis for $NH_4FePO_4.H_2O$.

| | $NH_4$ | Total Fe | $Fe^{III}$ | $PO_4$ | $H_2O$ by difference |
|---|---|---|---|---|---|
| | Per cent | Per cent | Per cent | | |
| Example | 8.2 | 29.6 | 7.6 | 51.8 | 10.4 |
| Theory | 9.64 | 29.9 | | 56.9 | 9.56 |

The ammonium ferrous phosphate made in accordance with this example was tested as an ingredient of metal protective finishes by grinding a series of paints of which the following is a typical example:

| | |
|---|---|
| Zinc yellow | 75 |
| Iron oxide | 10 |
| Magnesium silicate ext | 15 |
| Long oil alkyd resin | 49 |
| Raw linseed oil | 16.2 |
| Solvesso #3 | 32.4 |
| Drier | 1.4 |
| | 200.0 |

In the other paints listed in the table below the indicated amounts of ammonium ferrous phosphate were substituted for part of the zinc yellow so that the total weight of pigment remained constant. However, the vehicle and other ingredients were varied slightly to maintain a pigment volume of 40% in accordance with accepted practice in the paint industry.

The paints thus prepared were coated onto panels and exposed alternately to the weather and moisture condensation as in Example I. Controls in the series included a paint made as above, except that all of the zinc yellow was replaced by iron oxide and also a paint made by grinding red lead in raw linseed oil at 30% pigment volume. The results are tabulated below:

| Zinc Yellow | AFP | Iron Oxide | Magnesium Silicate | Red Lead | Panel ratings | | | |
|---|---|---|---|---|---|---|---|---|
| | | | | | 2 Mos. | 4 Mos. | 6 Mos. | 8 Mos. |
| 75 | ---- | 10 | 15 | ---- | 10 | 9+ | 8 | 4 |
| 65 | 10 | 10 | 15 | ---- | 10 | 10 | 10 | 9− |
| 53 | 22 | 10 | 15 | ---- | 10 | 10 | 10 | 9 |
| ---- | ---- | 85 | 15 | ---- | 8 | 0 | 0 | ---- |
| ---- | ---- | ---- | ---- | 100 | 10− | 9+ | 9+ | 9 |

The ammonium ferrous phosphate of this example was also tested as an ingredient of metal protective finishes on larger steel panels as follows:

Primers were made by grinding the pigments (see table below in which amounts shown refer to parts by weight) according to accepted practice in the paint industry at a 40% pigment volume basis in a mixture of long oil alkyd resin and raw linseed oil (50% of each on a solids basis) and thinned with Solvesso #3 to a suitable brushing consistency. Auto-body steel panels, prepared as noted in the table below, were coated with these primers by brushing, and exposed to the atmosphere in Florida for the times noted.

A control paint using Red Lead ground at 30% pigment volume basis in raw linseed oil was also exposed in like manner.

| Pigment | | | | | Pre-rusted Auto-body steel panels but wire brushed before painting, Average 8 Surfaces | |
|---|---|---|---|---|---|---|
| Red Lead | Zinc Yellow | AFP | Iron Oxide | Magnesium Silicate Extender | 16 Mos. Exposure | 28 Mos. Exposure |
| 100 | ---- | ---- | ---- | ---- | 10 | 7 |
| --- | 75 | ---- | ---- | 10 | 15 | 7 | 1+ |
| --- | 70 | 5 | 10 | 15 | 10 | 7 |
| --- | 55 | 20 | 10 | 15 | 10 | 9+ |

EXAMPLE III 1380 parts of secondary ammonium phosphate $(NH_4)_2HPO_4$ was dissolved in 38,000 parts of water at about 65° C. A solution 600 parts of caustic soda (NaOH) in 2000 parts of water at 65° C. was added in about 5 minutes. After stirring not more than 5 minutes, a solution of 2780 parts of copperas $(FeSO_4.7H_2O)$ in 10,000 parts of water at 65° C. was added over a period of 20 minutes and the precipitate stirred for 20 minutes at about 65° C. It was then filtered, washed free of sulfates, dried and ground to give 1870 parts of a slightly greenish crystalline powder.

EXAMPLE IV

A closed vessel, such as a five liter flask, equipped for agitation was filled with water and the water forced out by leading in an inert gas such as nitrogen under pressure. Thereafter the nitrogen or other gas was maintained at slightly above atmospheric pressure to effectively prevent the entrance of any oxygen. 1000 cc. of a solution containing 138 gms. of secondary ammonium phosphate $((NH_4)_2HPO_4)$ dissolved in water which had previously been boiled, was added and the volume was adjusted to 3300 cc. with previously boiled water and the solution heated to 65° C. 200 cc. of a solution containing 60 gms. of NaOH was added followed by the addition of a solution of 278 gms. of copperas $(FeSO_4.7H_2O)$ $(Fe^{III}$ 0.17%) in 775 cc. of water over a period of 20 minutes. A flocculent white precipitate was formed at once and, after about two-thirds of the copperas had been added, a crystalline precipitate appeared and all of the precipitate was converted to this form during the ensuing stirring period of 20 minutes at 65° C. The precipitate was allowed to settle and the supernatant liquid was drawn off. The precipitate was then divided into five portions and treated as follows:

A—Filtered, washed on a funnel and dried in the air at 60° C.

B—Filtered and washed on a funnel, then washed with alcohol and dried at room temperature.

C—Washed by decantation with boiled water under nitrogen, filtered on a funnel and dried in air at room temperature.

D—Washed as in C, filtered rapidly on a funnel and dried in a vacuum (about 28″ Hg) at 43° C.

E—Washed as in C but kept in slurry form out of contact with the air.

The following table shows the analysis of these various samples:

| | $(NH_4)$ | Total | $Fe^{III}$ | $PO_4$ | $H_2O$ by difference |
|---|---|---|---|---|---|
| A | 8.95 | 29.3 | 5.06 | 51.5 | 10.3 |
| B | 9.35 | 29.1 | 1.96 | 51.5 | 10.1 |
| C | 9.33 | 29.1 | 1.92 | 51.5 | 10.1 |
| D | 9.29 | 29.6 | 2.10 | 51.0 | 10.1 |
| E [1] | 9.54 | 29.1 | 0.35 | 52.1 | 9.3 |
| Theory | 9.64 | 29.9 | ---- | 50.9 | 9.56 |

[1] Calculations based on dry content of slurry at 60° C.

Although I have alluded to certain preferred methods of obtaining my novel pigment composition, my invention is not, as already stated, limited thereto. Generally, in such production I prefer to bring together any combination of ingredients, reagents or compounds which will bring into the solution for reaction the preferred ammonium ion $(NH_4^+)$, ferrous ion $(Fe^{++})$ and phosphate ion $(PO_4^{---})$. When these ions are brought together in solution, a precipitate (probably a ferrous acid phosphate) is caused to be formed which, when heated to a temperature above 55° C. (and particularly within a temperature range of from about 65° C. to the boil) at a pH of between about 6.0–9.0, rapidly converts to a flake-like, crystalline structure which consists of the desired form of minute pigment composition. Alternatively, I may first form the precipitate at an elevated temperature of, say, 65° C. and under alkaline conditions, in which event the conversion to the flake-like crystalline structure is very rapid and often takes place before completion of the precipitation.

In said preferred method of forming my pigment composition, I employ a solution of copperas $(FeSO_4.7H_2O)$ which is readily available commercially and contains a very low ferric iron content of the order of about 1.0% or less. The product resulting from the use of this copperas reagent will contain an appreciable amount of ferric iron which may range to as high as 30% of the total iron, under practical conditions of manufacture. The presence of ferric iron, however, is not to be unexpected since ferrous phosphate readily oxidizes and of necessity some oxidation takes place during the reactions which are carried out in the presence of air. The constancy of the amount of ferric iron in the product, however, is surprising since I have found that even if I deliberately contaminate the starting material with up to about 10% of ferric iron, the resulting product will be substantially the same as that obtained by following my preferred procedure.

If the amount of ferric iron in the starting copperas is increased to the order of, say, about 30% or 50% of the total iron present, the pigment which results will contain a larger amount of ferric iron but will be correspondingly less effective as a metal protective type of pigment composition. Accordingly, although the amount of ferric iron present in said pigment can be varied over a wide range, I prefer to exercise such control over the manufacture of my pigment that the major portion of its iron content will be in the ferrous rather than in the ferric condition. Such type of product will provide a type of metal protective pigment of maximum effectiveness. To insure optimum and maximum rust and corrosion-inhibiting qualities in the pigment and therefore the greatest degree of metal protection, I prefer that my pigment shall have the approximate composition, $$NH_4FePO_4.H_2O$$

and shall contain at least 7% of $NH_3$ and not more than 10% ferric iron.

To illustrate types of pigment compositions containing varying amounts of iron which may be prepared in accordance with my invention, the following table is given. This table summarizes the analyses of compositions prepared in accordance with Example II above from iron salts containing varying amounts of ferric iron:

| Per cent $Fe^{III}$ in iron salt (Copperas) | $NH_4$ | Total Fe | $Fe^{III}$ | $PO_4$ | $H_2O$ by difference |
|---|---|---|---|---|---|
| 0.17 | 8.70 | 29.2 | 4.79 | 52.3 | 9.80 |
| 10 | 7.88 | 29.2 | 9.34 | 50.4 | 12.52 |
| 30 | 6.55 | 29.5 | 15.56 | 48.4 | 15.55 |
| 50 | 4.74 | 29.0 | 22.02 | 47.5 | 18.76 |
| 100 | 2.95 | 27.3 | 27.3 | 44.3 | 25.45 |

My pigment composition also exhibits certain distinctive X-ray diffraction patterns or characteristics which remain very constant, regardless of the method used in producing said pigment. Thus, it will be found that substantially no change in the diffraction pattern occurs when the ferric iron in the product varies from the minimum obtained, about 1% of the total iron to about 30% of the total iron present, except a very slight decrease in sharpness as the ferric iron increases. When the ferric iron is increased above this point and, say, from about 30% to 50% of the total, no clear evidence has been found that a new crystalline compound exists, there being only a slight shifting of the diffraction lines and some tendency to diffuseness.

The following table gives the characteristic interplanar spacings in Angstrom units of the crystal lattices of my new pigment composition as calculated from the first 15 lines of the X-ray diffraction pattern exhibited when this composition is subjected to X-ray in accordance with the well-known Hull-Debye-Scherrer or "powder" method particularly described, for instance, in Chapter VI of Professor Wheeler P. Davey's text "A Study of Crystal Structure and Its Applications" (published by McGraw Hill, New York (1934)).

| Interplanar Spacing | Intensity |
|---|---|
| Angstrom units | |
| 8.83 | very strong. |
| 4.76 | medium. |
| 4.42 | very weak. |
| 4.23 | medium. |
| 3.65 | very weak. |
| 3.38 | medium. |
| 3.25 | very weak. |
| 2.93 | very weak. |
| 2.83 | very strong. |
| 2.51 | medium. |
| 2.43 | weak. |
| 2.35 | weak. |
| 2.30 | strong. |
| 2.14 | weak. |
| 2.12 | very weak. |

As already indicated, I contemplate using as a source for the iron component of my pigment any useful soluble iron compound, including such iron salts as the sulfates, chlorides, nitrates, acetates, etc. As a source for the preferred ferrous iron, however, I prefer to use commercial copperas ($FeSO_4.7H_2O$) because of its ready availability at very low, economical cost and its relatively pure form. Other sources of ferrous iron are equally effective for use, such as, for example, ferrous chloride, ferrous nitrate, ferrous acetate, and the like. Similarly, ammonium compounds such as the sulfate, hydroxide, chloride, etc., or various soluble phosphates (including the normal or tertiary phosphates, the dibasic or secondary phosphates, or the monobasic or primary phosphates) may be used as sources for the required ammonium ion ($NH_4^+$) and phosphate ion ($PO_4^{---}$), respectively. For example, one may use disodium phosphate, ammonium sulfate and caustic soda or disodium phosphate with ammonium hydroxide or other available sources of these ions readily obvious to those skilled in the art. I have found that both the ammonium and phosphate ions may be effectively and economically supplied by the use of secondary or diammonium phosphate (($NH_4)_2HPO_4$) and hence prefer this type of compound for use in the invention. Similarly, I may use tri-ammonium phosphate or ammonium biphosphate (monoammonium phosphate).

My invention contemplates broadly the carrying out of the reaction for the preparation of my new pigment composition at an elevated temperature and within a controlled pH range. Thus, it is preferred to operate above 55° C. but I have successfully prepared my new composition at temperatures as low as about 40° C. and I have operated at a pH as low as 5.2 and also as high as 10.5. However, in the lower pH brackets, the composition tends to show appreciable solubility and, at a pH of 10 or above, rapid hydrolysis with loss of ammonia begins. Accordingly, a pH range of 6.0 to 9.0 is preferred.

As already pointed out, one principal use contemplated from my novel pigment composition is as an essential ingredient of stable metal protective film-forming compositions. It may be used as the sole pigment in such composition but I prefer to employ it therein in admixture with other metal protective pigments, such as zinc yellow, zinc oxide, and the like. It is also advantageously useful as a flame-retardent, this being important because of the combination thus possible of a metal protective finish which is also flame-retardent.

The type of vehicle used in the metal protective finish may be varied to meet specific requirements, in accordance with accepted practices of the paint industry, without detracting from the value of my novel pigment composition. Similarly, the proportion of pigment to vehicle may be varied to meet specific requirements with results which will be obvious to those skilled in the paint art. As stated, my novel pigment may be used as the sole pigmenting substance in a metal protective primer or other type finish. However, I prefer to use it in admixture with other pigments or extenders therefor and the amounts used are largely determined by economic reasons. The proportions used in the examples are given by way of illustration only and are not critical to the invention. As desired, the utilizable amounts of my novel pigment may, for example, range from about 5%-30% and up to 50% or 100%, by weight, based on the total pigment in the coating composition. It follows naturally that the lesser amounts produce less pronounced effects.

When my novel pigment composition is used as an essential ingredient in coating compositions, definitely improved metal protective properties result. This is clearly evident from the ratings of test exposure panels referred to above. The exposures described were in the open air but metal protective finishes are frequently used under conditions of immersion in water. This is a very severe test and it is very common for such finishes to fail by blistering wherein the pigmented film separates over relatively large areas from the metal surface. I have found that films containing my novel ammonium ferrous phosphate pigment show a definitely improved adherence to the metal under such conditions. Further investigation of this property has led to the surprising observation that this attribute of improved adherence of the film appears to be a characteristic advantage of my new composition and to hold true not only under water but also in the air at ordinary temperatures. Even films which have been badly charred by direct flames are more adherent than similar films containing no ammonium ferrous phosphate. Tests on the use of coating compositions containing my new pigment have also demonstrated that they dry more rapidly than otherwise similar compositions containing no ammonium ferrous phosphate. This has been particularly noticeable in the case of certain phenolic resins.

Use of my novel pigment with zinc yellow, for example, is also advantageous in that it enables a more effective use of zinc yellow in metal protective finishes. At the same time, since my pigment composition replaces part of the zinc yellow for a given use, less zinc yellow may be consumed and yet yield a superior type of finish. This is especially important in view of the fact that at times there have been serious shortages in available supplies of zinc and chromium.

While adapted for particular use as the primer pigment in coating vehicles, as a rust-inhibitive pigment for the protection of metallic as well as non-metallic surfaces, particularly those subjected to corrosion, such as iron and steel surfaces or non-ferrous metals, including aluminum, zinc, magnesium and the like, or alloys thereof, my pigment composition is not limited to said use. Being useful for providing a stable, durable form of film exhibiting definitely marked improvements over prior films and being adapted to impart to such film the desired characteristic of impermeability to moisture, my pigment composition is obviously adapted to other coating composition uses than that of metal protection. Thus, it is generally useful for incorporation in all types of coating compositions, including paints, enamels, lacquers, finishes, greases, etc. For example, the pigment can be readily incorporated into various oil type binders, such as treated or untreated drying oils or modifications or derivatives of the same, i. e., oil-modified polyhydric-polybasic acid resins and phenolformaldehyde resin varnishes, or in other types of binders, such as varnishes or resins, as well as in aqueous systems, such as emulsions and water-soluble binders. In particular, the pigment may be incorporated in various oleoresinous vehicles, including linseed oil, Chinawood oil, oiticica oil, and the like, nitrocellulose and other cellulose derivatives used in coating compositions, chlorinated rubber, alkyd and alkyd-fortified oleoresinous systems, phenolformaldehyde resins, such as Bakelite and the like, Vinylite, vinyl acetate and polyhydric alcohol-mixed esters of drying oil acids and other monofunctional, monocarboxylic acids, such as betafurylacrylic acid, delta-2,4-hexadienoic acid, methacrylic acid, alphavinyl cinnamic acid, and the like, and synthetic resin vehicles generally.

As in instances of other primer pigments, top coats can be applied over the primer film to increase durability of the system containing the pigments of this invention. An uncoated primer film containing my novel product, however, is durable. Thus, the film containing my pigment is usually found to be intact and serviceable at a period in exposure when films containing prior types of metal protective pigments are badly chalked and failed by reason of such exposure.

As already indicated, it is contemplated that my novel pigment composition may be augmented by the addition of other metal protective pigments, such as zinc yellow, zinc oxide, or by other well-known prior art pigments, such as chrome yellow, chrome orange, or prime white pigments, such as titanium oxide, zinc sulfide, lithopone, etc., or by extenders therefor. The several ingredients may be added separately to vehicles in preparing coating compositions or they may be mixed prior to use in any way known to the art, such as by mechanical mixing of the dry powders, by slurry mixing, or even, in some cases, by special processes of precipitation.

The exact manner by which my novel metal protective pigment composition functions when used as an ingredient of metal protective paints, is not presently known to me. It appears, however, that ammonium ferrous phosphate, although nominally insoluble, does have some slight solubility in water, sufficient to give ammonium, ferrous, and phosphate ions. It is possible that the ammonium ion, when in contact with a metal surface, exerts a passivating influence thereon. Support to this theory is lent by the fact, which can be demonstrated, that metals show little, if any, corrosion when in contact with an atmosphere more or less saturated with ammonia gas which, in the presence of moisture, will give ammonium ions. It is entirely possible that the phosphate ion may also play a part in the passivating effect of the ammonium ferrous phosphate. The ferrous ion may function principally to give a compound which has the desired very slight solubility. However, it is also possible that it may function as an inhibitor of corrosion through the suppression of the solution of iron from the metal surface through some such phenomenon as the mass action effect. Some support is lent to this theory because of the fact that some other analogous compounds containing other metals in place of the iron are not only not effective for metal protection but even seem to have harmful properties. Finally, I believe it is probable that all of these factors play a part in the excellent properties of my new composition and it may well be that ammonium ferrous phosphate is so outstanding in its performance because of this combination of factors.

I have also found that my new pigment composition has another property which may well account for its lending metal protective properties to paints and the like. I find that paint films containing said pigment are more impervious to penetration by water vapor than films made in exactly the same manner but without my new pigment composition. This property is especially surprising and whether it is a function of the flake-like structure of the pigment particles or is the result of some hitherto unsuspected reaction with the paint vehicles is at present unknown to me.

I claim as my invention:

1. A metal-protective pigment composition consisting of a mixture of ammonium ferrous phosphate in flake-like, crystalline form and zinc yellow, the ammonium ferrous phosphate component of said mixture ranging from about 5% to 30% by weight of the total pigmenting ingredients and the major portion of its iron content being in the ferrous state.

2. A metal-protective primer comprising a mixture, by weight based on 100%, of from 50 to 70 parts of zinc yellow, 5 to 25 parts of ammonium ferrous phosphate in flake-like, crystalline form, 10 parts of red iron oxide, and 15 parts of a siliceous extender, said phosphate component having the major portion of its iron content in the ferrous state.

3. A new metal-protective pigment composition, consisting of zinc yellow together with from 5% to 50% by weight, based on the total pigment, of ammonium ferrous phosphate, said phosphate being in flake-like, crystalline form, essentially insoluble in water, and having the major portion of its iron content in the ferrous condition.

GODFREY GRIMM.

REFERENCES CITED

The following references are of record in the file of this patent:

UNITED STATES PATENTS

| Number | Name | Date |
|---|---|---|
| 1,651,694 | Green | Dec. 6, 1927 |
| 2,363,570 | Caprio | Nov. 28, 1944 |

FOREIGN PATENTS

| Number | Country | Date |
|---|---|---|
| 212,431 | Swiss | 1941 |

OTHER REFERENCES

Mellor, Comprehensive Treatise on Inorganic & Theoretical Chemistry, 1935, vol. XV, page 395. (Copy in Div. 59.)